Figure 1:
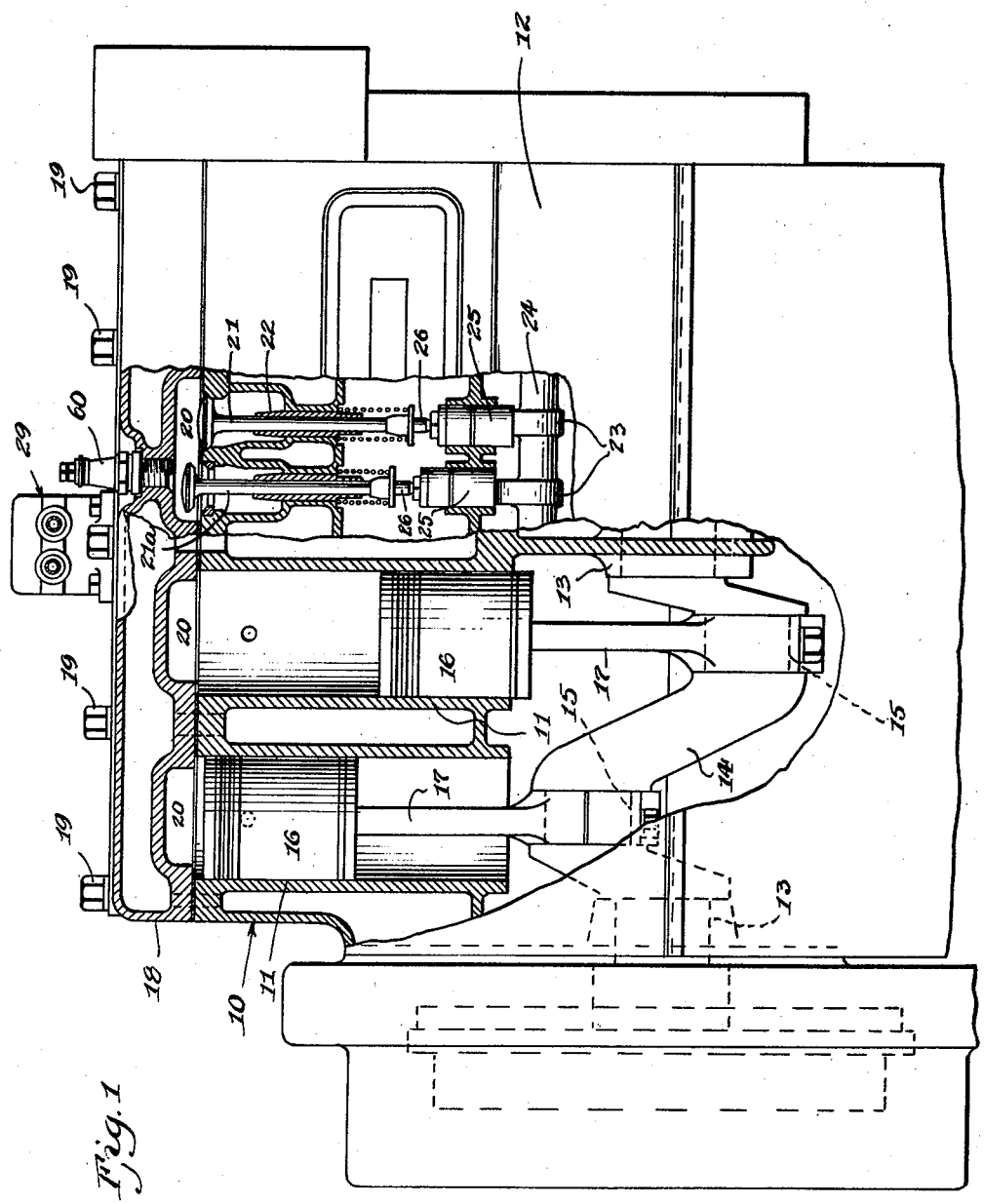

Patented Dec. 29, 1942

2,306,950

UNITED STATES PATENT OFFICE

2,306,950

FOUR-STROKE CYCLE FUEL INJECTION ENGINE

Enos R. Jacoby, Muskegon, and Earl Ginn, North Muskegon, Mich., assignors, by mesne assignments, to Continental Motors Corporation, a corporation of Virginia Application February 21, 1940, Serial No. 320,038

2 Claims. (Cl. 123—32)

Our invention relates to internal combustion engines and more particularly to a four-stroke cycle fuel injection engine of the spark ignition type.

In engines of the type aforesaid, it is known that condensation of vaporized fuel takes place in the engine cylinder, especially when the engine is cold, although at the present time carbureted engines have been developed to such an extent as to minimize fuel condensation to a large degree. It has been proposed heretofore to eliminate an engine carburetor by employing a fuel injection device for injecting fuel directly into the intake manifold, the engine intake passage, or into the engine cylinder. The difficulty with previous proposals is that the fuel has been injected during the suction stroke and an excessive amount of fuel condensation usually occurred causing engine dilution and abnormal wear of the cylinder walls as well as inefficient engine performance. In carbureted engines the temperature of carbureted fuel will vary considerably and consequently it is difficult to obtain uniform engine performance under various atmospheric conditions.

An object of our present invention is to construct an improved fuel injection engine of the spark ignition type by providing means effecting a more uniform control of fuel characteristics and resulting in better engine performance, easy starting, a minimum of fuel condensation and the elimination to a great extent, of objectionable cylinder wear.

Another object of our invention is to improve engine performance by incorporating with said engine, means controlling and injecting fuel into the engine cylinder in such a way as to minimize the time element between fuel injection and combustion, thereby providing a uniform control of fuel characteristics, facilitating engine starting, providing improved fuel economy, and prolonging the engine life by minimizing cylinder wear and other undesirable features usually met with in fuel injection engines of the conventional type and in carbureted engines.

A further object of our invention is to eliminate the difficulties enumerated above, to improve engine performance by more particularly providing an assembly in which the fuel is injected directly into the engine cylinder only during the engine compression stroke, and to further incorporate with this assembly, a control device and connections which control the beginning of fuel injection and the closing of fuel injection. In the present engine, full advantage has been taken of the heat of compression, permitting the construction of such an engine with a higher compression ratio than heretofore has been possible, resulting in improved engine operating characteristics and providing an increased power output.

A still further object of our invention is to facilitate the economical manufacure and maintenance of internal combustion engines by the use of the present invention in which a novel fuel injection apparatus is incorporated with the engine in a novel manner and so arranged and assembled as to facilitate the assembly of manual and automatic controls with the engine.

Figure 2:
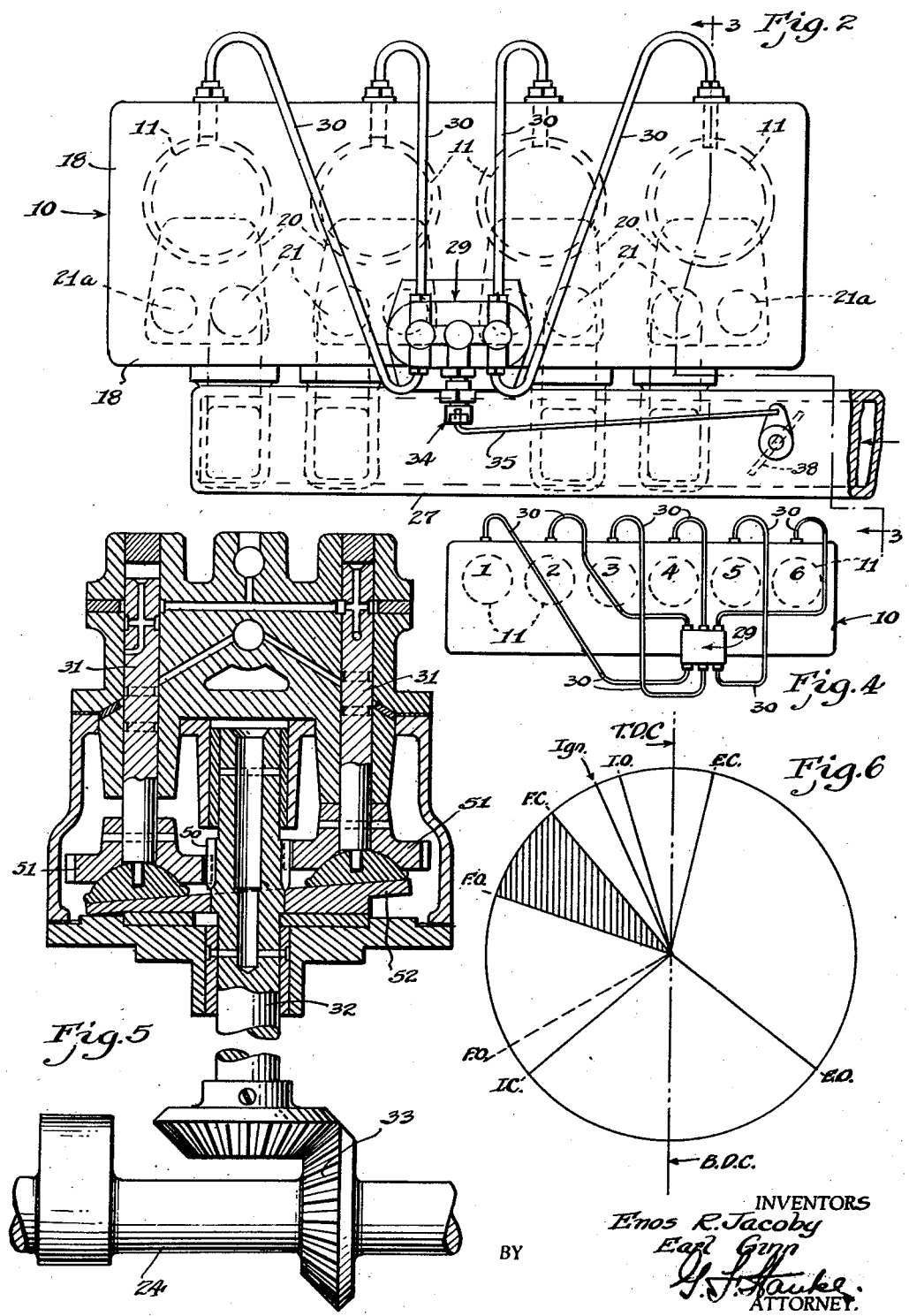
Figure 3:
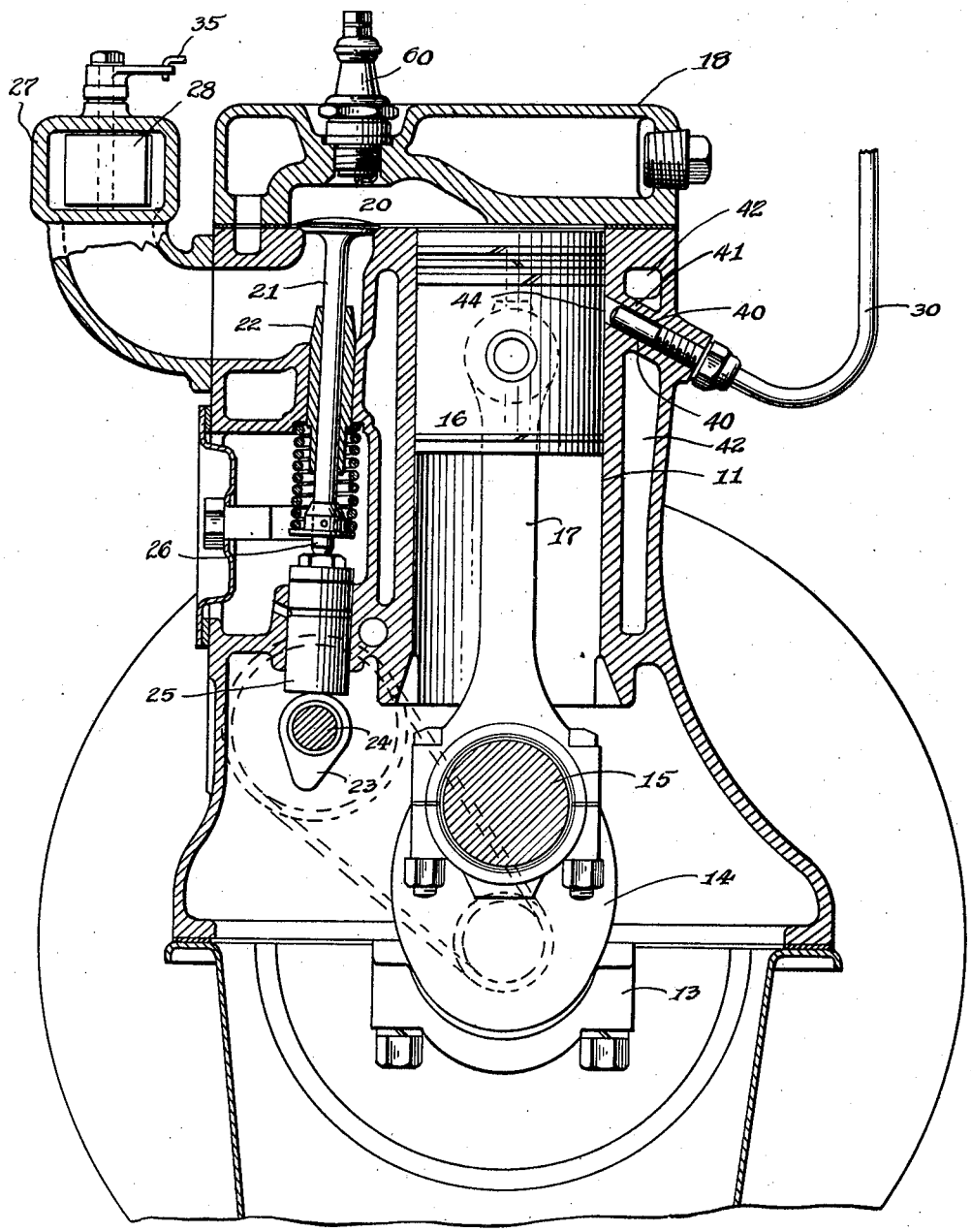

For a more detailed understanding of our invention, reference may be had to the accompanying drawings in which preferred embodiments of our invention are illustrated and in which like parts are referred to by like reference characters throughout the several views, and in which:

Fig. 1 is a side elevational view of a four-stroke cycle fuel injection engine constructed in accordance with our invention, and showing parts thereof in section thereby to illustrate the interior construction and relative position of the internal engine parts, Fig. 2 is a plan view thereof, showing the fuel pump and the connections between the said fuel pump control device and the air control device, Fig. 3 is a vertical transverse sectional view through one of the engine cylinders taken on the line 3—3 of Fig. 2 and showing in detail the assembly of the fuel injecting means and the relation of the fuel injection nozzle relative to other cooperating mechanisms of the engine, Fig. 4 is a diagrammatic plan view of an injection system incorporated with a six-cylinder-in-line engine, Fig. 5 is a fragmentary sectional detail view illustrating the fuel pump and means for driving same, in timed relation with the engine crankshaft, and Fig. 6 is a diagrammatic showing of the engine timing diagram of the present preferred construction.

It will be obviously understood that the principles of our present invention may be incorporated with various types and sizes of engines, but for purposes of illustration we have chosen to illustrate our invention in connection with an in-line multi-cylinder engine A of the L-head valve type, this engine comprising in general a cylinder structure 10 including a plurality of cylinders 11 and crankcase 12 which may be, if desired, formed integrally with the cylinder, and is preferably constructed to support crankshaft bearings 13 for supporting a multi-cylinder crankshaft 14 having a plurality of crank portions 15. Pistons 16 are operable in the cylinders 11 and are connected in each instance with a crank 15 of the crankshaft by means of a connecting rod 17.

A cylinder head 18 is secured to the cylinder structure by means of bolts 19 or other suitable fastening devices and preferably provides a combustion chamber 20 and supports the conventional spark plug 60. The engine cyclical events are controlled by intake and exhaust valves 21 and 21a, respectively, and said valves are supported by the usual valve guides 22 carried by the cylinder structure. These valves are preferably opened by suitable cams 23 carried by the camshaft 24 supported by the engine crankcase, these cams acting through suitable cam followers or tappets 25 which engage the valve stem 26 in the conventional manner.

We preferably provide an air intake manifold 27 for this multi-cylinder engine illustrated herein, said air intake manifold being preferably provided with an air throttle valve 28 controlling the volume of air permitted to be introduced into the engine cylinders through this air intake manifold.

The fuel injection means incorporated with this preferred engine structure includes a fuel pump 29 constructed and arranged to meter and inject fuel under pressure to the fuel supply lines 30 which lead to the various engine cylinders, and more particularly it will be noted, that in the present engine construction which embodies a plurality of aligned cylinders that separate fuel lines or conduits connect each of these engine cylinders with the fuel pump. The fuel pump employed with our proposed engine structure may be of any conventional type though we prefer to use that type of pump which embodies a plurality of metering and pumping plungers 31 driven by the camshaft 24 through a drive shaft 32 and beveled gears 33. The drive shaft 32 is drivingly connected with the pump plungers 31 by pinion 50 and spur gears 51 secured to the plungers 31. A wobble plate 52 driven by the shaft 32 causes the plungers 31 to reciprocate while being rotated, and the fuel is successively pumped into the fuel lines 30. However the pump per se forms no part of the present invention and is shown here in detail as being illustrative of a preferred type of pump.

The internal mechanism of the pump is such as to provide for periodic discharge of fuel into the various fuel lines or conduits 30 in timed relation with the engine crankshaft, and the fuel pump is preferably provided with a control device 34 which may be connected with the air throttled valve 38 by means of linkage or other suitable connection 35, so that the volume of air supplied to the engine may be varied proportionally to the volume of fuel successively injected into the engine cylinders. This fuel pump 29 is in all cases preferably mounted on the top of the engine by securing same in any suitable manner on the top of the cylinder head 18.

When employing this type of fuel pump with a four cylinder in-line engine it is preferable to mount the fuel pump at a mid-point on the top of the engine structure, but in a six cylinder engine illustrated herein (see Fig. 4) we find it preferable in some instances to mount the fuel pump on the top of the engine intermediate cylinders Nos. 4 and 5.

It will be noted that each of these fuel lines 30 connect the fuel pump with the individual cylinders. More particularly it will be observed that the fuel line 30 connects with an internally bored passage 40 formed in a boss 41 in the cylinder structure which boss extends transversely across the cooling jacket 42 substantially surrounding the engine cylinder 11. The fuel line 30 is connected with a fuel injection nozzle 43 supported within the bored out portion of the boss 41 and is provided with conventional jet or jets 44. The bored passage 41 opens through the cylinder wall at a predetermined point and it will be noted that at the time the mixture is ignited in the combustion chamber 20, that the piston 16 is at or near the top of its stroke and that the piston completely masks the injection nozzle 43.

In fact, we preferably provide a construction in which the injection nozzle is masked by the piston during at least the last ten per cent of the engine compression stroke. The beginning of fuel injection takes place subsequently at the beginning of the engine compression stroke, and the fuel pump controls are actuated to vary the beginning of injection in order to control the amount of fuel which is to be injected into the engine cylinder in accordance with the demands of the engine.

Referring more particularly to Fig. 6 illustrating the preferred timing diagram, it will be noted that the shaded portion of the diagram indicates that portion of the compression stroke in which fuel is injected into the engine cylinder. In the four-stroke cycle engine illustrated herein it will be noted that the piston moves inwardly of the engine cylinder from "top dead center" (TDC) to "bottom dead center" (BDC), thereby sucking pure air into the engine cylinder which air is preferably comparatively cool. Following the engine suction stroke the piston then moves outwardly of the engine cylinder from BDC to TDC to compress the change of air in said cylinder. The intake closes a little past BDC indicated as at IC and subsequently to the closing of the intake valve, fuel injection may begin and in the present diagram FO indicates the beginning of injection and FC indicates the ending of the fuel injection. The dotted line FO indicates a very early commencement of fuel injection. Ign indicates approximately where ignition begins, which is preferably a few degrees before the piston reaches TDC. The exhaust valve opens at EO, preferably a little before the piston reaches BDC, and the exhaust valve closes at EC a few degrees after the piston has passed TDC, but subsequently to the opening of the intake valve which is indicated at IO a few degrees in advance of the time when the piston reaches TDC. The above described sequence of events completely describes a preferred cycle of the engine cyclical events. The control of the fuel injection is such as to preferably close before the piston has moved by the fuel injection nozzle on the compression stroke so that the supply of fuel is completely shut off before the piston masks the fuel injection nozzle.

It will be noted that the fuel injection nozzle 43 is subjected to the cooling influences of the cooling fluid circulated through the cooling jacket 42 of the engine, and it will be noted that the boss 41 is located at a point in the cooling jacket 42 where the cooling fluid is relatively cool, thus preventing overheating of the fuel injection nozzle 43. The masking of this fuel injection nozzle by the piston at the time of maximum temperatures in the combustion chamber and cylinder also shields the fuel injection nozzle from the heat of combustion to such an extent as to maintain said fuel injection nozzle comparatively cool at all times, and thereby prevent the formation of excessive carbon deposits on the nozzle.

Our present injection engine, which is designed to begin the injection of fuel substantially near the beginning of the compression when operating under full load characteristics, utilizes the heat of compression to assist in the vaporization of the fuel injected into the engine cylinder. Furthermore, by injecting fuel during the compression stroke the heat of compression is not only vaporizing the fuel to a high degree, but does this with a minimum of fuel condensation on the cold cylinder walls. The time element in which the fuel is present in the cylinder is greatly reduced in the present construction as compared with previously proposed constructions, in which the fuel is introduced into the cylinder with the intake air during the suction stroke. In other words, the fuel is introduced into the engine cylinder during the higher temperature portion of the cycle, thereby reducing condensation and preventing the washing of lubricating oil from the cylinder wall, causing an abnormal wear of the cylinder wall.

Another distinct advantage of injecting fuel into the engine cylinder during the compression stroke of the engine, is that the latent heat of the fuel injected into the cylinder is utilized to absorb part of the heat of compression, thereby permitting an increase in the engine compression ratio. The present construction provides for a more uniform control of fuel characteristics and permits the accurate control of temperature rises in the vaporized fuel, so that the fuel and air mixture is brought to a temperature near the kindling point before ignition. Therefore, when the spark plug is fired the combustible mixture is ignited at substantially the same point in the cycle under various heat conditions of engine operation.

It may be further noted that the present constructions facilitate economical manufacture of power plants, provides for increased power output, maintenance is minimized, provides for more economical engine operation, and provides a materially improved engine structure giving more uniform engine operation under various atmospheric conditions.

Although we have illustrated in detail but one embodiment of our invention and have described certain detail features preferably incorporated therewith, it will be apparent to those skilled in the art to which our invention pertains, that various changes and modifications may be made therein without departing from the spirit of our invention or from the scope of the appended claims.

We claim:

1. A four-stroke cycle multi-cylinder fuel injection engine of the spark ignition type comprising, a plurality of cylinders each including a combustion chamber and a fuel inlet port opening in the cylinder side wall, a crankshaft, pistons operable in each of said cylinders and operatively connected with said crankshaft, a relatively low pressure fuel injection means including a fuel pump supported on said engine, fuel atomizing injection nozzles having relatively fine discharge orifices and supported by each of said cylinders and discharging fuel through said port opening, said nozzles being masked by the engine piston when cylinder combustion temperatures are at a maximum, fuel conduits connecting each of said injection nozzles with said fuel pump, means for introducing pure air into said cylinders during the engine suction stroke and including an air manifold and an air throttle valve, means including a control device associated with said fuel pump and actuated in timed relation with crankshaft rotation whereby to inject fuel into said cylinders near the beginning of the engine compression stroke and to end injection before said engine piston has masked said injection nozzles, and means connecting the air throttle with the fuel pump control device acting to vary the volume of air supplied to said cylinders proportionally to volume of fuel introduced thereto.

2. In a fuel injection internal combustion engine of the spark ignition type, a cylinder structure having a cylinder provided with a fuel inlet port opening in the cylinder side wall, a crankshaft, a piston operable in said cylinder, means including a fuel atomizing injection nozzle having relatively fine discharge orifices supported by said cylinder structure to inject fuel directly into the cylinder through said port opening, said nozzle being in the cylinder wall masked by said piston when cylinder combustion temperatures are at a maximum, means introducing pure air into said cylinder at substantially atmospheric pressure during the engine intake period, and relatively low pressure fuel injection means including a regulable fuel pump for injecting fuel into said engine cylinder during the compression stroke, said means timed with the engine crankshaft to begin fuel injection near the beginning of the engine compression stroke and to end said fuel injection at the same point in the compression cycle for all engine load conditions and prior to the time when said nozzles are masked by the piston.

ENOS R. JACOBY.
EARL GINN.